United States Patent [19]
Akiyama et al.

[11] Patent Number: 4,593,988
[45] Date of Patent: * Jun. 10, 1986

[54] FOCUS CONDITION INDICATING DEVICE OF AN AUTO-FOCUS SYSTEM

[75] Inventors: Hideaki Akiyama, Tokyo; Susumu Iguchi, Yokohama; Hirofumi Horigome, Kawasaki, all of Japan

[73] Assignee: Ricoh Company, Ltd., Tokyo, Japan

[*] Notice: The portion of the term of this patent subsequent to May 13, 2003 has been disclaimed.

[21] Appl. No.: 462,114

[22] Filed: Jan. 28, 1983

[30] Foreign Application Priority Data

Jan. 30, 1982 [JP] Japan .................................. 57-13712
Feb. 5, 1982 [JP] Japan ............................. 57-15027[U]

[51] Int. Cl.⁴ .......................................... G03B 17/20
[52] U.S. Cl. .................................................. 354/409
[58] Field of Search .................... 354/406, 409, 195.13, 354/473

[56] References Cited

U.S. PATENT DOCUMENTS

| | | | |
|---|---|---|---|
| 4,126,870 | 11/1978 | Kondo | 354/406 |
| 4,303,321 | 12/1981 | Enomoto et al. | 354/406 |
| 4,307,947 | 12/1981 | Jyoujiki | 354/406 |
| 4,336,987 | 6/1982 | Shenk | 354/409 |
| 4,352,545 | 10/1982 | Uno et al. | 354/406 |

*Primary Examiner*—L. T. Hix
*Assistant Examiner*—David M. Gray
*Attorney, Agent, or Firm*—Oblon, Fisher, Spivak, McClelland & Maier

[57] ABSTRACT

A device for indicating the current focus condition of an auto-focus system for use in a camera and the like includes an indication processing circuit interposed between an arithmetic processing circuit, which receives distance information to an object of interest, and an indicator/controller. The indication processing circuit allows to maintain the detected in-focus condition sufficiently long so that an observer can judge the proper focus condition even if the object is in slight motion, or the camera is being held by hands.

10 Claims, 14 Drawing Figures

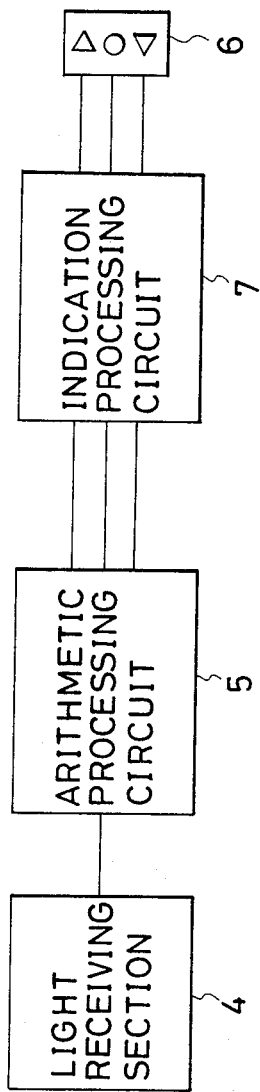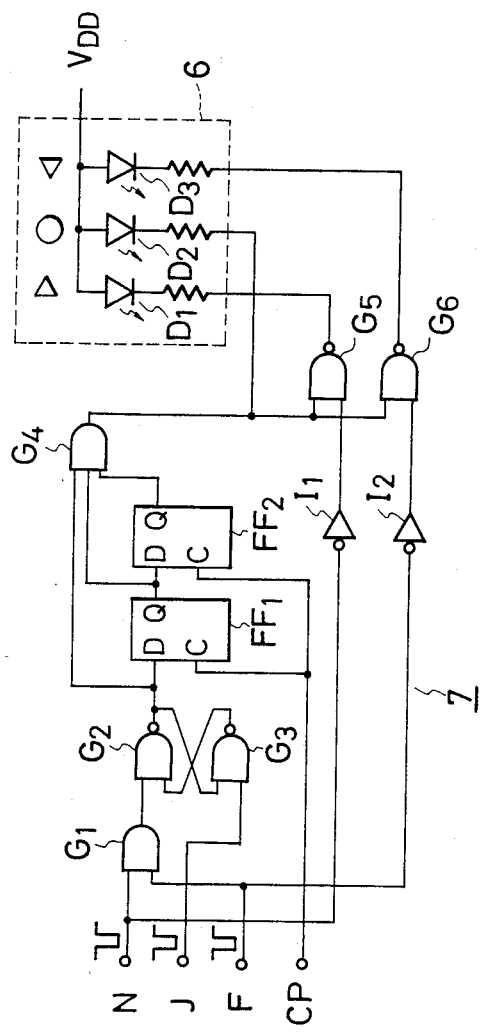
FIG.5
FIG.6

CP
OUTPUT OF $G_2$
OUTPUT OF $FF_1$
OUTPUT OF $FF_2$
OUTPUT OF $G_1$

FOCUS CONDITION INDICATING DEVICE OF AN AUTO-FOCUS SYSTEM

BACKGROUND OF THE INVENTION

1. Field of the Invention

This invention relates to a device for indicating the focus condition, i.e., whether it is too close, in-focus or too far, and, in particular, it relates to a focus condition indicating device of an auto-focus system for use in a still camera, cinematographic camera (8 mm, 16 mm, etc.), video camera and the like to indicate the measured result of a distance to an object of interest.

2. Description of the Prior Art

In general, in an auto-focus system, a distance to an object is measured, and the thus obtained distance information is processed to determine whether it is too close, in-focus or too far, on the basis of which the current focus condition is indicated in an indicator and the position of the focusing lens is controlled (forward movement, no movement or backward movement). And, this series of steps is repetitively carried out.

FIG. 1 schematically shows a distance measuring system when applied to a single reflex camera. As shown, a quick return mirror or main mirror 1 is provided with a sub-mirror 2 which reflects the light coming through the main mirror 1 toward the bottom portion of a mirror box, where a beam splitter 3 is located, as shown in FIG. 2. Below the beam splitter 3 is defined a focusing reference surface F' which is located optically equidistantly as a film surface F with respect to the main mirror 2. Provided as attached to the beam splitter 3 is a pair of solid-state image sensors $S_1$ and $S_2$, each comprised of a charge coupled device (CCD) having a train of sensing elements. The CCDs $S_1$ and $S_2$ are optically located on both sides of and equidistantly from the focusing reference surface F'. These CCDs $S_1$ and $S_2$ scan the illumination distribution of an object of interest and the sensed values between the corresponding sensing elements are then compared to produce a contrast evaluation function.

By changing the position of the lens with respect to the film surface F, or the focusing condition, a contrast curve is obtained from the image sensor $S_1$, which is located closer to the mirror 2 and thus the focusing lens with respect to the focusing reference surface F' or film surface F, and the thus obtained contrast curve is graphically shown in FIG. 3(a). Similarly, a contrast curve $C_2$ may be obtained from the other image sensor $S_2$, and this curve is also shown in FIG. 3(a). Since the image sensors $S_1$ and $S_2$ are located in front of (too close side) and aft of (too far side) the focusing reference surface F', respectively, the curves $C_1$ and $C_2$ are out of phase, as shown in FIG. 3(a). Since the image sensors $S_1$ and $S_2$ are equidistantly located from the focusing reference surface F', if the focusing lens, initially in the too close region, is moved toward the too far region, the contrast value $C_1$ obtained from the image sensor $S_1$ gradually increases to reach it maximum and then starts to go down. On the other hand, the contrast value $C_2$ obtained from the image sensor $S_2$ also gradually increases and it reaches its maximum after the contrast curve $C_1$ having already passed its own maximum. Thereafter, the contrast curve $C_2$ also goes down.

Under the circumstances, the merging point between the two curves $C_1$ and $C_2$, which is a midpoint between the respective maximum points, indicates that the object of interest is sharply focused on the film surface F. On the other hand, the condition of $C_1$ greater than $C_2$ indicates the too close condition and the condition of $C_1$ smaller than $C_2$ indicates the too far condition. Thus, in order to determine such a focusing condition, a differential curve $C_3$ is obtained by taking a difference between the contrast curves $C_1$ and $C_2$, as shown in FIG. 3(c), and by comparing the thus obtained differential curve $C_3$ with predetermined threshold levels $T_1$ (positive) and $T_2$ (negative), it is determined to be in focus if the value of $C_3$ is in the range between $T_1$ and $T_2$, or nearly equal to zero; on the other hand, it is determined to be too close, if $C_3$ is above $T_1$, and it is determined to be too far, if $C_3$ is below $T_2$. The regions indicated as "BEYOND RANGE" in FIG. 3(a) cannot be used because the contrast level is extremely low in these regions. It is true that the differential curve $C_3$ approaches zero also in these regions; however, this condition is secluded from the in-focus condition by watching the behavior of the two contrast curves $C_1$ and $C_2$.

FIG. 3(b) schematically shows an example of the indicator for indicating the current focusing condition, whether it is too close, in-focus or too far, from left to right, and such an indicator may be provided in a viewfinder of a camera. In FIGS. 2 and 3, the distance between the film surface F and the detecting surface of each of the image sensors $S_1$ and $S_2$ is denoted by 1. The focusing condition thus determined is then indicated in a separate indicator or the viewfinder, and the operator may move the focusing lens either toward or away from the film surface depending upon the current focusing condition to bring the lens into the in-focus position. Alternatively, in the case where an automatic lens moving mechanism is provided, such a detected signal may be used to bring the lens into the required in-focus position automatically.

FIG. 4 shows in block diagram a typical prior art detection/control mechanism in an auto-focus system, and it includes a light receiving section 4 comprised of such elements as image sensors $S_1$ and $S_2$, an arithmetic processing circuit 5 for producing the contrast curves $C_1$ and $C_2$ on the basis of the distance information detected by the light receiving section 4 to compare the difference between the two curves $C_1$ and $C_2$ with predetermined threshold levels $T_1$ and $T_2$ to determine the current focusing condition to be too close, in focus or too far and an indication/control section 6 for indicating the current focusing condition or controlling the movement of the focusing lens in response to a signal supplied from the arithmetic processing circuit 5. The operation of the mechanism shown in FIG. 4 includes a series of a light receiving (distance measuring) step, an arithmetic processing (determination of the current focusing condition) step and an indicating and controlling step, and such a series of steps is carried out in repetition.

The focusing accuracy of the structure shown in FIG. 4 may be enhanced by setting the threshold levels substantially closer to zero. In such a case, however, the focusing condition indicator rapidly changes its indicated state, in focus or out of focus, for example, when the camera is held by the operator's hands or the object of interest is in motion. If this happens, it is very difficult to properly judge the current focusing condition. And, from a practical viewpoint, it is not always required to obtain the highest accuracy, though it is better to have a possible highest accuracy at all times. On the other hand, the threshold levels $T_1$ and $T_2$ may be set larger in absolute value so as to allow to judge the current focusing condition easily, but, in this case, the focusing accuracy becomes lowered and unsatisfactory.

SUMMARY OF THE INVENTION

The disadvantages of the prior art are overcome with the present invention and an improved focusing condition indicating device is provided. In accordance with the present invention, there is provided a device for indicating the current focus condition of an auto-focus system, said device comprising: means for measuring a distance to an object of interest; first processing means for processing the measured distance successively to determine the focus condition corresponding to the measured distance, said focus condition being either one of too close, in-focus and too far conditions; storing means for storing a first predetermined number of the focus conditions determined by said first processing means; second processing means for processing the thus stored first predetermined number of focus conditions to produce an in-focus indication signal only when said first predetermined number of focus conditions are found to include at least a second predetermined number of in-focus conditions; and indicating means connected to said first and second processing means for indicating the current focusing condition, said indicating means indicating the in-focus condition in response to said in-focus indication signal supplied from said second processing means and the too close or too far condition in response to signals supplied from said first processing means.

In accordance with another aspect of the present invention, there is provided a device for indicating the current focus condition of an auto-focus system, said device comprising: means for measuring a distance to an object of interest; processing means for processing the measured distance successively to determine the focus condition corresponding to the measured distance, said focus condition being either one of too close, in-focus and too far conditions; state holding means connected to receive the in-focus condition information from said processing means for holding a first predetermined state over a predetermined time period at its output in response to said in-focus condition information supplied from said processing means, said state holding means automatically changing its output state to a second predetermined state after elapsing said predetermined time period; indicating means connected to the output of said state holding means and also to receive said too close and too far condition information from said processing means for indicating the current focus condition in response to the focus condition information supplied thereto; and inhibiting means connected to the output of said state holding means, to receive said too close and too far condition information from said processing means and also to said indicating means, said inhibiting means inhibiting said processing means from supplying said too close and too far condition information to said indicating means while said state holding means supplies its first predetermined state at its output.

Therefore, it is a primary object of the present invention to provide an improved device for indicating the current focusing condition in an auto-focus system.

Another object of the present invention is to provide a device for indicating the current focusing condition which allows to eliminate meaningless changes in the indicated focusing state, for example, due to manual handling of a camera or slight movement of an object of interest.

A further object of the present invention is to provide a device for indicating the current focusing condition in an auto-focus system which is much easier to use as compared with the prior art devices and yet high in accuracy.

A still further object of the present invention is to provide a focusing condition indicating device which is relatively simple in structure and thus easy to make.

Other objects, advantages and novel features of the present invention will become apparent from the following detailed description of the invention when considered in conjunction with the accompanying drawings.

BRIEF DESCRIPTION OF THE DRAWINGS

FIG. 5 is a block diagram showing the basic structure of a focusing condition indicating device embodying the present invention;

FIG. 6 is a circuit diagram partly in blocks and partly in logic symbols showing one embodiment of the present invention;

DESCRIPTION OF THE PREFERRED EMBODIMENTS

Figure 1:
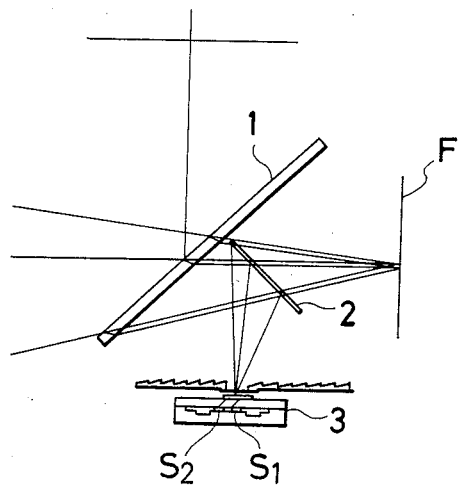
FIG. 1 is a schematic illustration showing the structure of a typical auto-focus system to which the present invention may be applied.
Figure 2:
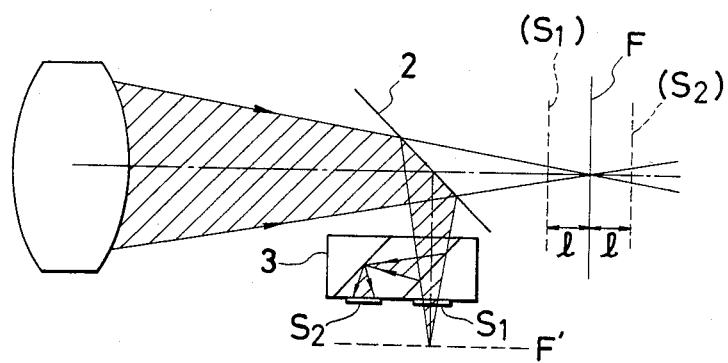
FIG. 2 is a schematic illustration showing on an enlarged scale the main components of the structure shown in FIG. 1.
Figure 3A:
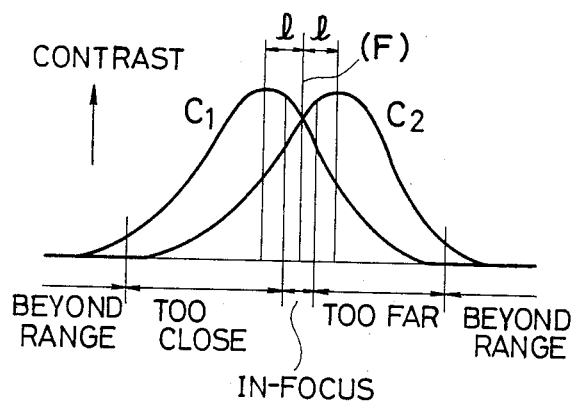
FIGS. 3 (a)-(c) are useful for understanding the operation of the system shown in FIGS. 1 and 2, in which FIGS. 3 (a) and (c) are graphs indicating the characteristics of the pair of image sensors $S_1$ and $S_2$
FIG. 3(b) is a schematic illustration showing one example of the focusing condition indicator, indicating too close, in focus and too far from left to right.
Figure 3B:
Figure 3C:
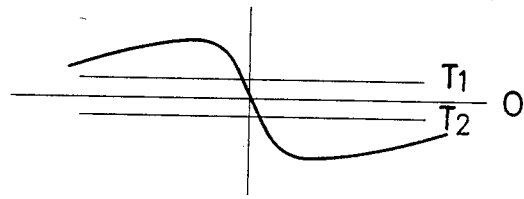
Figure 4:
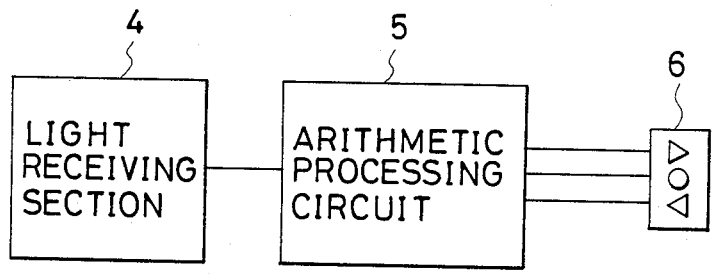
FIG. 4 is a block diagram showing the prior art device.

Referring now to FIG. 5, showing in block diagram the basic structure of one embodiment of the present invention, the focusing condition indicating device includes a light receiving section 4, comprised of elements such as image sensors $S_1$ and $S_2$ shown in FIGS. 1 and 2, for detecting the distance to an object of interest, an arithmetic processing circuit 5 for processing the distance information thus detected by the image sensors to obtain a current focusing condition data, an indication processing circuit 7 for storing and processing the focusing condition data over a predetermined number of cyclic operations, and an indicator/controller section 6, which indicates the focusing condition and/or controls the position of the focusing lens. In the present structure of FIG. 5, the indication processing circuit 7 is additionally provided as interposed between the arithmetic processing circuit 5 and the indicator/controller section 6 as compared with the prior art structure of FIG. 4.

The indication processing circuit 7 is so structured to store $n-1$ number of focusing condition data supplied from the arithmetic processing circuit 5, which processes the distance information supplied from the image sensors in repetition and to determine the number of the in-focus condition data among the $n-1$ number of the stored focusing condition data plus the currently supplied focusing condition data from the arithmetic processing circuit 5, whereby, if the number of the in-focus condition data has been found to be m or more, subjected to the condition that m is smaller than n, then an in-focus signal is supplied to the section 6 to have it indicate the in-focus condition; on the other hand, if the number of the in-focus condition data has been found to be less than m, then the currently supplied focusing condition data, i.e., the final data in the nth arithmetic processing operation, is supplied to the section 6 to have it indicate the focusing condition of the final data.

For example, for $n=3$ and $m=1$, the indication processing circuit 7 stores the focusing condition data for the last two cycles of arithmetic processing operations, and if at least one in-focus condition data is found among the stored data plus the current data supplied from the arithmetic processing circuit 5, an in-focus signal is supplied to the indicator/controller section 6 thereby causing it to indicate the in-focus condition. On the other hand, if absence of in-focus condition data is found, then the current data, whether too close or too far, is supplied to the section 6 thereby causing it to so indicate. As a result, if one out of three cycles of the arithmetic processing operation has detected the existence of in-focus condition, the present indicating device indicates the in-focus state. Accordingly, the out-of-focus condition data for this period are neglected.

FIG. 6 shows one embodiment of the present indicating device, and it includes four input terminals N, J, F and CP, all of which are connected to receive "too close", "in focus", "too far" and "clock pulse" signals, respectively, as supplied from the arithmetic processing circuit 5. As shown in FIG. 6, the too close, in focus and too far signals are indicated as low level signals. The device includes an AND gate $G_1$ having one input connected from the terminal N and the other input connected from the terminal F. Also provided in the device is a pair of cross-coupled NAND gates $G_2$ and $G_3$. The remaining input of the NAND gate $G_2$ is connected from the output of the AND gate $G_1$, and the remaining input of the NAND gate $G_3$ is connected from the terminal J. The output of the cross-coupled NAND gates $G_2$ and $G_3$ is connected to the D input of a flipflop $FF_1$, whose C input is connected from the terminal CP. Another flipflop $FF_2$ is so provided to have its D input connected from the Q output of the flipflop $FF_1$ and its C input connected from the CP terminal. An AND gate $G_4$ has its first input connected from the output of the cross-coupled NAND gates $G_2$ and $G_3$, second input connected from the Q output of the flipflop $FF_1$ and third input connected from the Q output of the flipflop $FF_2$. The output of the AND gate $G_4$ is connected to one input of each of NAND gates $G_5$ and $G_6$, whoses the other inputs are connected from the terminals N and F through inverters $I_1$ and $I_2$, respectively.

As shown, the indicator/controller section 6 includes three light emitting diodes $D_1$, $D_2$ and $D_3$, whose anodes are commonly connected to a voltage source $V_{DD}$. The output of the AND gate $G_4$ is also connected to the cathode of the LED $D_2$ through a current limiting resistor; whereas, the outputs of the NAND gates $G_5$ and $G_6$ are connected to the cathodes of the LEDs $D_1$ and $D_3$, respectively, through current limiting resistors. When one of the gates $G_4$ through $G_6$ supplies a low level signal as its output, the corresponding LED in the indicator section 6 is lit to indicate the current focusing condition, i.e., too close, in focus or too far.

Figure 7:
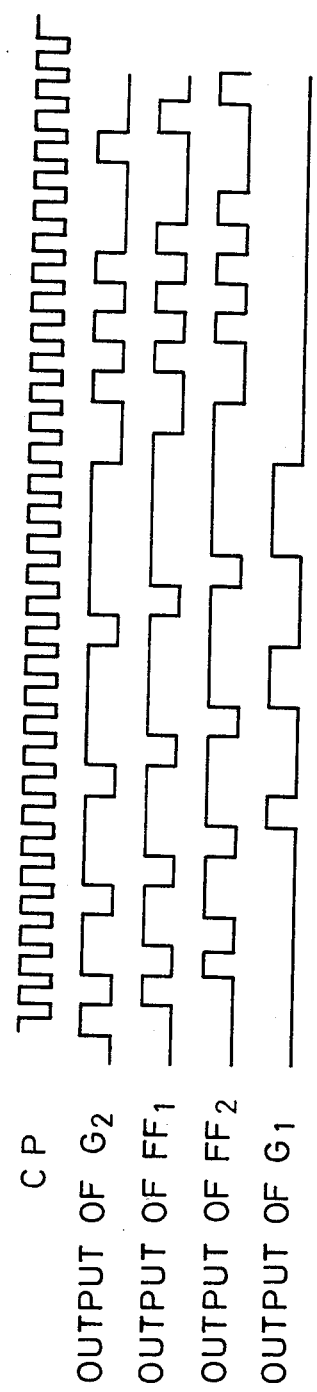
FIG. 7 is a timing chart which is useful for understanding the operation of the device shown in FIG. 6.

With the above-described structure, since the outputs of the three flipflops $G_2$-$G_3$, $FF_1$ and $FF_2$ are connected to three inputs of the AND gate $G_4$, if at least one in-focus condition data exists over the three consecutive data, i.e., two data stored in the flipflops $FF_1$ and $FF_2$ and one data present in the flipflop $G_2$-$G_3$, the AND gate $G_4$ supplies a low level output, and, thus, the LED $D_2$ is lit to indicate the existence of the in-focus condition. On the other hand, in the case of absence of in-focus condition data in any of the three flipflops, the currently existing out-of-focus condition data, too close or too far, is supplied to the corresponding one of the two LEDs $D_1$ and $D_3$ through the respective inverters $I_1$, $I_2$ and NAND gates $G_5$, $G_6$. Such an operation will become further clearer when reference is made to the time chart of FIG. 7 which shows the clock pulse CP and the outputs of the gate $G_2$, flipflops $FF_1$ and $FF_2$ and the gate $G_4$.

In this manner, in accordance with the present invention, it is so structured that the in-focus condition is indicated over an extended period of time as long as the frequency of the detected in-focus conditions is more than a predetermined value. As a result, the indicator is prevented from changing its indicating states due to fluctuating components such as slight movement of an object of interest as long as the object remains in a predetermined in-focus range, which may be practically treated as the in-focus condition. On the other hand, if it is, in fact, out of focus, since the likelihood of producing an in-focus signal is very low, the indicator does not indicate the in-focus condition, and the current focusing condition will be indicated.

Figure 8:
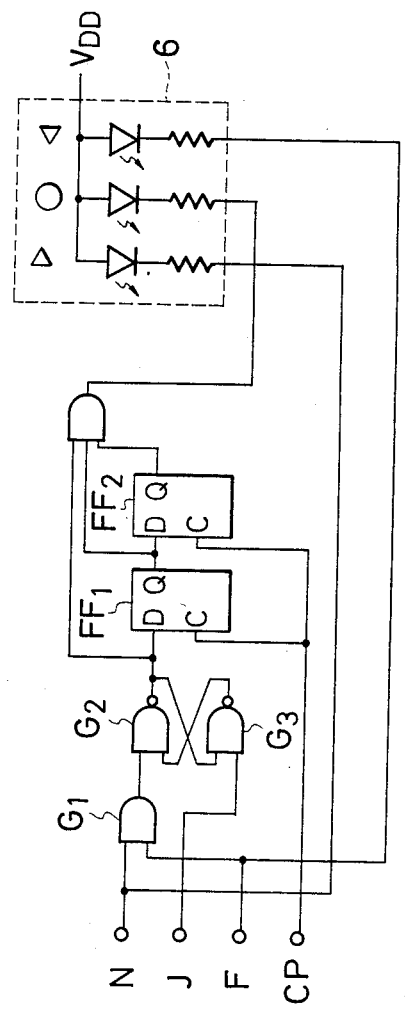
FIG. 8 is a circuit diagram partly in blocks and partly in logic symbols showing another embodiment of the present invention.

FIG. 8 shows another embodiment of the present invention, whose structure is obtained by eliminating the inverters $I_1$, $I_2$ and NAND gates $G_5$, $G_6$ from the structure of FIG. 6. In this case, even if the in-focus condition is detected beyond a predetermined number of times, the currently detected focusing condition is superposingly indicated because the inhibit circuit formed by the inverters $I_1$, $I_2$ and NAND gates $G_5$, $G_6$ is removed. In other words, even if the last preceding cycle has detected the presence of in-focus condition, if the currently detected focusing condition is a too close condition, then both of the in-focus and too close conditions are indicated at the same time.

Another embodiment of the present invention may be so structured that, in addition to the indication of the in-focus condition under the condition that m number or more of the in-focus condition data are found among n number of detected data, the too close and/or too far conditions may be indicated superposingly under the condition that 1 number of the too close and/or too far condition data are found. It should also be noted that the indication processing circuit 7 may be integrated into the arithmetic processing circuit 5.

Figure 9:
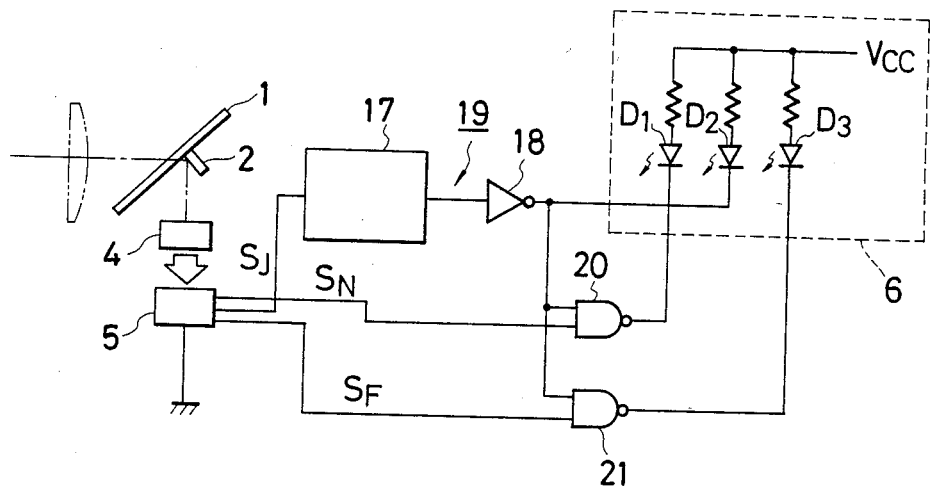
FIG. 9 is a circuit diagram partly in blocks and partly in logic symbols showing a further embodiment of the present invention.

FIG. 9 shows a still further embodiment of the present invention. It should be noted that identical numerals are used to indicate identical elements as practiced throughout the present specification. As shown, the focus condition indicating device of FIG. 9 includes the light receiving section 4, including a pair of image sensors, and the arithmetic processing section 5, as in the previous embodiments. The arithmetic processing circuit 5 supplies three outputs $S_J$ (in focus), $S_N$ (too close) and $S_F$ (too far), depending upon the result obtained by processing distance information supplied from the detecting section 4. As different from the previous embodiments, these focusing condition signals become high to indicate the presence of the respective states. The present device includes a retriggerable monostable multivibrator 17 which is connected to receive the in-focus condition signal $S_J$ from the circuit 5 and supplies its output to an inverter 18. The multivibrator 17 and the inverter 18 are series connected to form a waveform converting circuit 19, and the inverter 18 supplies a high level output only when the multivibrator 17 has not received the in-focus condition signal $S_J$ beyond a predetermined time period; otherwise, the inverter 18 keeps its output at the low level state.

The output of the inverter 18 is connected to one input of each of NAND gates 20 and 21, whose the other inputs are connected to receive the out-of-focus condition signals $S_N$ and $S_F$, respectively. Thus, only when the inverter 18 supplies a high level output, either one of the out-of-focus condition signals $S_N$ and $S_F$ is inverted by the corresponding NAND gate 20 or 21. In other words, these NAND gates 20 and 21, in effect, form an inhibit circuit to inhibit the passage of the signals $S_N$ and $S_F$ under the condition that the inverter 18 supplies a low level output. As shown, the output of the inverter 18 is connected to the cathode of the LED $D_2$ for indicating the in-focus condition. The output of the NAND gate 20 is connected to the cathode of the LED $D_1$ for indicating the too close condition, and the output of the NAND gate 21 is connected to the cathode of the LED $D_3$ for indicating the too far condition. The anodes of these LEDs $D_1$–$D_3$ are commonly connected to the voltage source $V_{CC}$ through respective current-limiting resistors.

In operation, when the in-focus condition signal $S_J$ is supplied from the arithmetic processing circuit 5, the monomultivibrator 17 of the waveform converting circuit 19 is triggered to supply a high level output, which is inverted by the inverter 18 into a low level signal, so that the LED $D_2$ is lit to indicate the presence of the in-focus condition. Under the circumstances, the low level output of the inverter 18 is also supplied to the NAND gates 20 and 21, so that the outputs of these NAND gates 20 and 21 are held at high level. Accordingly, the LEDs $D_1$ and $D_3$ are not lit. Then, even if the too close condition signal $S_N$ is supplied from the circuit 5 upon termination of the in-focus condition signal $S_J$, nothing happens because the monomultivibrator 17 maintains its output state (high in the present embodiment) over a predetermined time period, during which the inverter 18 keeps its output at the low level. As long as the inverter 18 supplies a low level output, the too close condition signal $S_N$ is inhibited by the NAND gate 20 and no changes in the state of indication takes place. As described previously, since the monomultivibrator 17 may be retriggered, if another in-focus condition signal $S_J$ is supplied from the circuit 5 while the monomulti 17 is in operation, the in-focus indicator $D_2$ will be kept on over a predetermined time period starting from the retriggered point in time. On the other hand, if the in-focus condition signal $S_J$ has not been supplied to the monomulti 17 beyond the predetermined time period of the monomulti 17, then the monomulti 17 changes its output state to a low level, which then causes the output of the inverter 18 to become high whereby the in-focus indicator $D_2$ is turned off. Under the condition, if the too close condition signal $S_N$ is supplied from the circuit 5, the NAND gate 20 supplies a low level output, so that the too close indicator $D_1$ is turned on.

Figure 10:
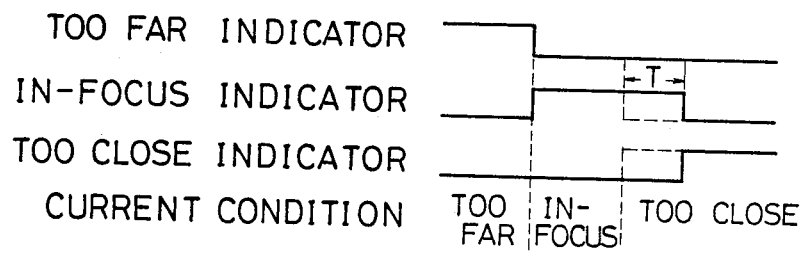
FIG. 10 is a timing chart useful for understanding the operation of the device shown in FIG. 9.

Next, one mode of operation of the embodiment of FIG. 9 will be described with particular reference to the time chart of FIG. 10. It is assumed that an object to be focused is motionless and the focusing lens initially in the too far region is gradually moved into the too close region. Under such circumstances, the present focus condition indicator initially indicates the too far condition, and, when the lens enters into the in-focus region, the indicator immediately changes its indication to the in-focus condition. Thereafter, even when the lens enters into the too close region, the in-focus condition is still kept indicated over the time period T governed by the monomulti 17. After elapsing the time T, if the lens is still in the too close region, then the too close condition is indicated.

In this manner, in accordance with the present invention, as soon as the in-focus condition signal $S_J$ is received as supplied from the arithmetic processing circuit 5, the in-focus condition is indicated; however, the out-of-focus condition signals $S_N$, $S_F$ are neglected during the time period T while the monomulti 17 is kept on, and, thus, the out-of-focus conditions are not indicated during this period. And, only when one of the out-of-focus conditions has continued beyond the time period T, the corresponding out-of-focus condition is indicated. As a result, the indication of the in-focus condition becomes stable, and thus easy to observe and judge the true condition. Preferably, the time period T may be set in the range from approximately 0.1 to 0.5 seconds.

Figure 11:
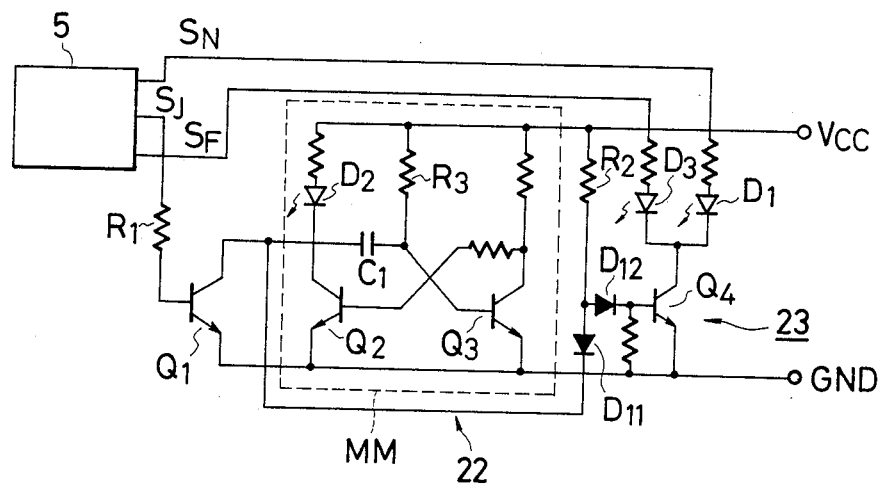
FIGS. 11 and 12 are circuit diagrams partly in blocks and partly in logic symbols showing still further embodiments of the present invention.

FIG. 11 shows a further embodiment of the present invention. As shown, when the in-focus condition signal $S_J$ is supplied from the arithmetic processing circuit 5 to the base of an NPN transistor $Q_1$ of a waveform converting circuit 22 through a resistor $R_1$, the transistor $Q_1$ is turned on to lower its collector voltage, so that a monomultivibrator MM is triggered and its output state is inverted. When the output state of the monomulti MM is inverted, its transistor $Q_3$ is turned off and its the other transistor $Q_2$ is turned on, and, therefore, the in-focus condition indicating LED $D_2$ is turned on. At the same time, the transistor $Q_4$ of an inhibit circuit 23 including a gate circuit comprised of diodes $D_{11}$ and $D_{12}$ and a resistor $R_2$ is turned off, so that the out-of-focus condition indicating LEDs $D_1$ and $D_3$ are held inoperative. If the monomulti MM has not received the in-focus condition signal $S_J$ beyond the time period T, or the monomulti MM has maintained its stable condition beyond the time period T, the transistor $Q_4$ of the inhibit circuit 23 is turned on to have one of the LEDs $D_1$ and $D_3$ lit depending upon the current condition. The time period T may be expressed as $T = 0.7 \times C_1 \times R_3$ where $C_1$ and $R_3$ are the capacitive and resistive values of the elements indicated, respectively.

Figure 12:
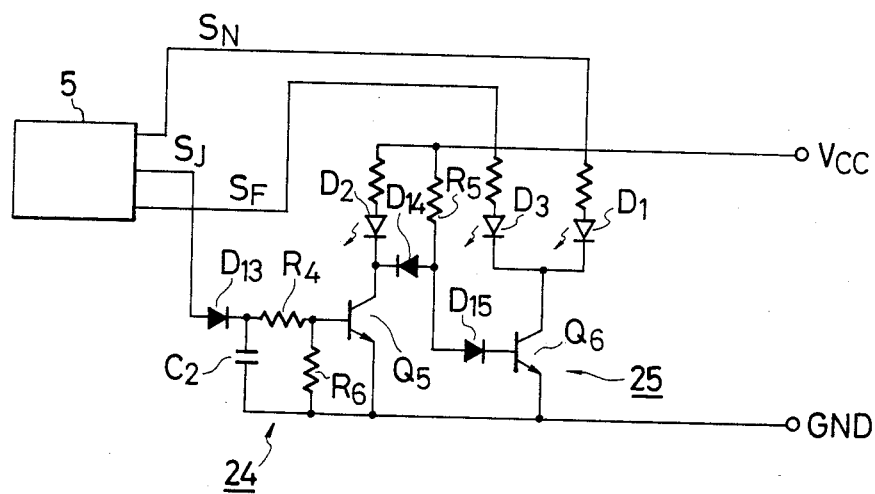

FIG. 12 shows a still further embodiment of the present invention. As shown, when the in-focus condition signal $S_J$ is supplied from the arithmetic processing circuit 5, the capacitor $C_2$ is charged through the diode $D_{13}$ of a waveform converting circuit 24, and the charges thus stored are then applied to the base of a transistor $Q_5$ through a resistor $R_4$ thereby causing the transistor $Q_5$ turned on. Turning on of the transistor $Q_5$ allows the in-focus indicating LED $D_2$ to become operative, and, similarly with the embodiment of FIG. 11, the transistor $Q_6$ of an inhibit circuit 25 including a gate circuit comprised of diodes $D_{14}$ and $D_{15}$ and a resistor $R_5$ is turned off, thereby inhibiting the out-of-focus condition indicating LEDs $D_1$ and $D_3$ from being lit. Even after termination of the in-focus condition signal $S_J$, the transistor $Q_5$ is kept on due to the charges stored in the capacitor $C_2$ of the waveform converting circuit 24 over the time period T. After elapsing the time period T, the transistor $Q_5$ is turned off, which then causes the transistor $Q_6$ of the inhibit circuit 25 turned on, so that one of the out-of-focus condition indicating LEDs $D_1$ and $D_3$ is lit depending upon the then existing condition. In this case, assuming that $R_4$ is much smaller than $R_6$, it may be shown that $T = -C_2 R_4 \ln(0.7/V_{cc})$ where ln is a natural logarithm and $V_{cc}$ is the power supply voltage.

While the above provides a full and complete disclosure of the preferred embodiments of the present invention, various modifications, alternate constructions and equivalents may be employed without departing from the true spirit and scope of the invention. Therefore, the above description and illustration should no be construed as limiting the scope of the invention, which is defined by the appended claims.

What is claimed is:

1. A device for indicating the current focus condition of an auto-focus system, said device comprising:
    means for measuring a distance to an object of interest;
    first processing means for processing the measured distance successively to determine the focus condition corresponding to the measured distance, said focus condition being either one of too close, in-focus and too far conditions;
    storing means for storing a first predetermined number of the focus conditions successively determined by said first processing means;
    second processing means for processing the thus stored first predetermined number of focus conditions to produce an in-focus indication signal only when said first predetermined number of focus conditions are found to include at least a second predetermined number of in-focus conditions; and
    indicating means connected to said first and second processing means for indicating the current focusing condition, said indicating means indicating the in-focus condition in response to said in-focus indication signal supplied from said second processing means and the too close or too far condition in response to signals supplied from said first processing means.

2. A device of claim 1 wherein said storing means includes a plurality of flip-flops connected in series, said plurality corresponding in number to a sum of said first predetermined number and one, whereby a clock pulse signal is supplied to transfer the data from one to the next one.

3. A device of claim 2 wherein said plurality of flip-flops include an input flip-flop which stores the latest data supplied from said first processing means.

4. A device of claim 2 wherein said second processing means includes an AND gate having a plurality of inputs each of which is connected from the output of each of the corresponding flipflops.

5. A device of claim 4 wherein said indicating means includes first, second and third indicators, said first and third indicators being connected to receive too close and too far signals supplied from said first processing means and said second indicator being connected to the output of said AND gate.

6. A device of claim 5 wherein said first, second and third indicators each comprise a light emitting diode.

7. A device of claim 1 further comprising inhibiting means connected to said first and second processing means and to said indicating means for inhibiting the indication of the too close and too far conditions while said in-focus indication signal is being supplied to said indicating means.

8. A device for indicating the current focus condition of an auto-focus system, said device comprising:
    means for measuring a distance to an object of interest;
    processing means for processing the measured distance successively to determine the focus condition corresponding to the measured distance, said focus condition being either one of too close, in-focus and too far conditions;
    state holding means connected to receive the in-focus condition information from said processing means for holding a first predetermined state over a predetermined time period at its output in response to said in-focus condition information supplied from said processing means, said state holding means automatically changing its output state to a second predetermined state after elapsing said predetermined time period;
    indicating means connected to the output of said state holding means and also to receive said too close and too far condition information from said processing means for indicating the current focus condition in response to the focus condition information supplied thereto; and
    inhibiting means connected to the output of said state holding means, to receive said too close and too far condition information from said processing means and also to said indicating means, said inhibiting means inhibiting said processing means from supplying said too close and too far condition information to said indicating means while said state holding means supplies its first predetermined state at its output.

9. A device of claim 8 wherein said state holding means includes a monostable multivibrator and said first predetermined state is the on-state of said monomulti.

10. A device of claim 8 wherein said state holding means includes a transistor and a time constant circuit connected between the base and emitter of said transistor whereby said first predetermined state corresponds one of the on/off condition of said transistor.

* * * * *